Nov. 9, 1926.
J. HOJNOWSKI
1,606,535
ARTIFICIAL CHRISTMAS TREE
Filed April 24, 1926     2 Sheets-Sheet 1
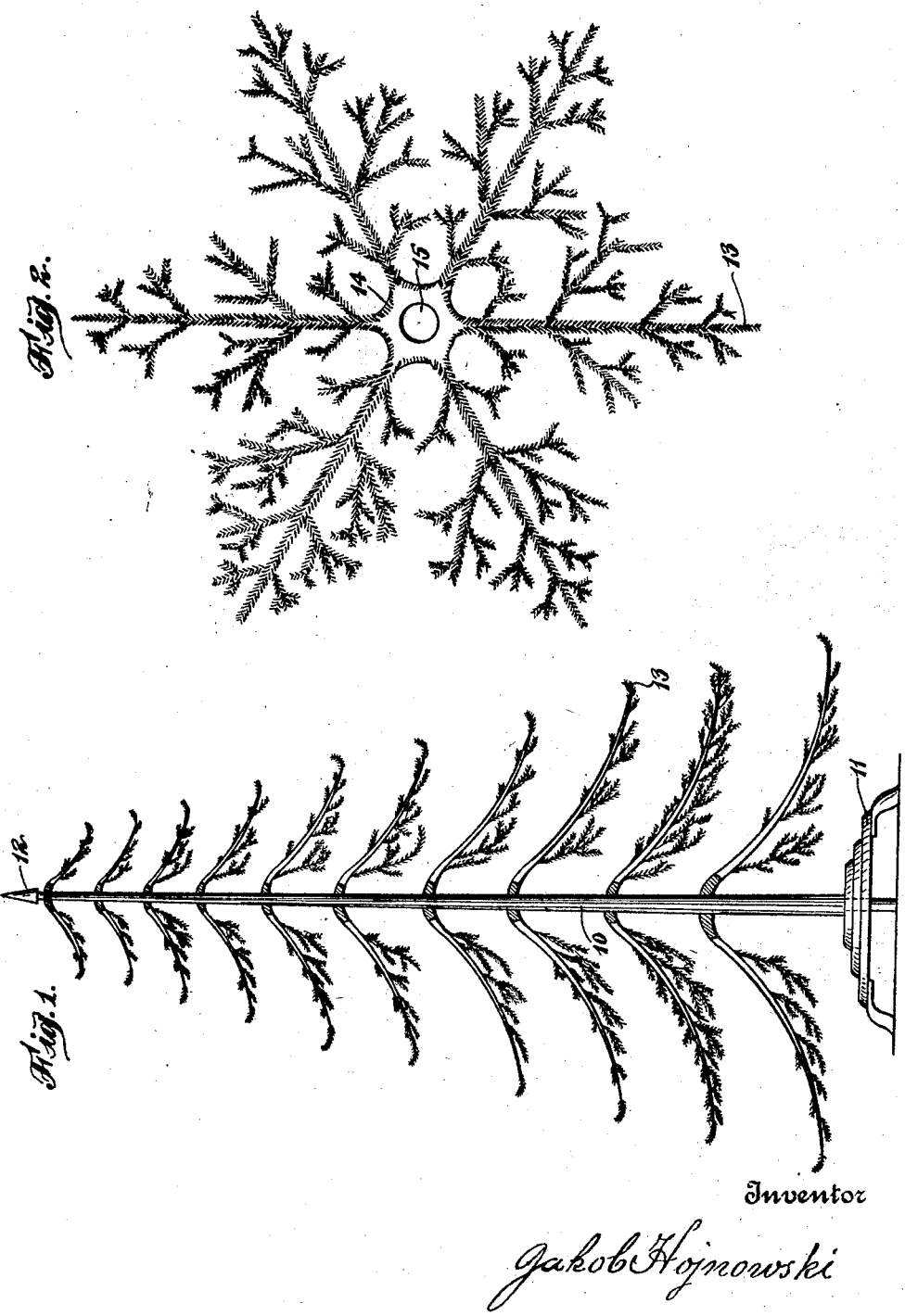
Inventor
Jakob Hojnowski Nov. 9, 1926.

J. HOJNOWSKI 1,606,535

ARTIFICIAL CHRISTMAS TREE

Filed April 24, 1926    2 Sheets-Sheet 2

Inventor

Jakob Hojnowski

Patented Nov. 9, 1926.

1,606,535

UNITED STATES PATENT OFFICE.

JAKOB HOJNOWSKI, OF NEKOOSA, WISCONSIN.

ARTIFICIAL CHRISTMAS TREE.

Application filed April 24, 1926. Serial No. 104,504.

This invention relates to improvements in artificial Christmas trees, and it is the principal object of the invention to provide a tree composed of a plurality of exchangeable branch sections.

Another object of the invention is the provision of and method of making an artificial Christmas tree, the significant symbols of which may readily be attached to or detached from the tree trunk.

A further object of the invention is the provision of an artificial Christmas tree equipped with a plurality of trunk engaging elements adapted to receive and hold the branches, allowing a ready exchange of one set of branches for instance branches simulating the branches of a fir tree, for other branches.

A still further object of the invention is the provision of an artificial Christmas tree or other tree of simple and inexpensive construction adapted to be readily assembled and disassembled and packed for shipment.

These and other objects and advantages of my invention will become more fully known as the description thereof proceeds, and will then be specifically defined in the appended claims.

In the accompanying drawings:

Fig. 1 is a front elevation of an artificial Christmas tree made according to the present invention.

Fig. 2 is a top plan detail view of a branch section.

Figure 3:
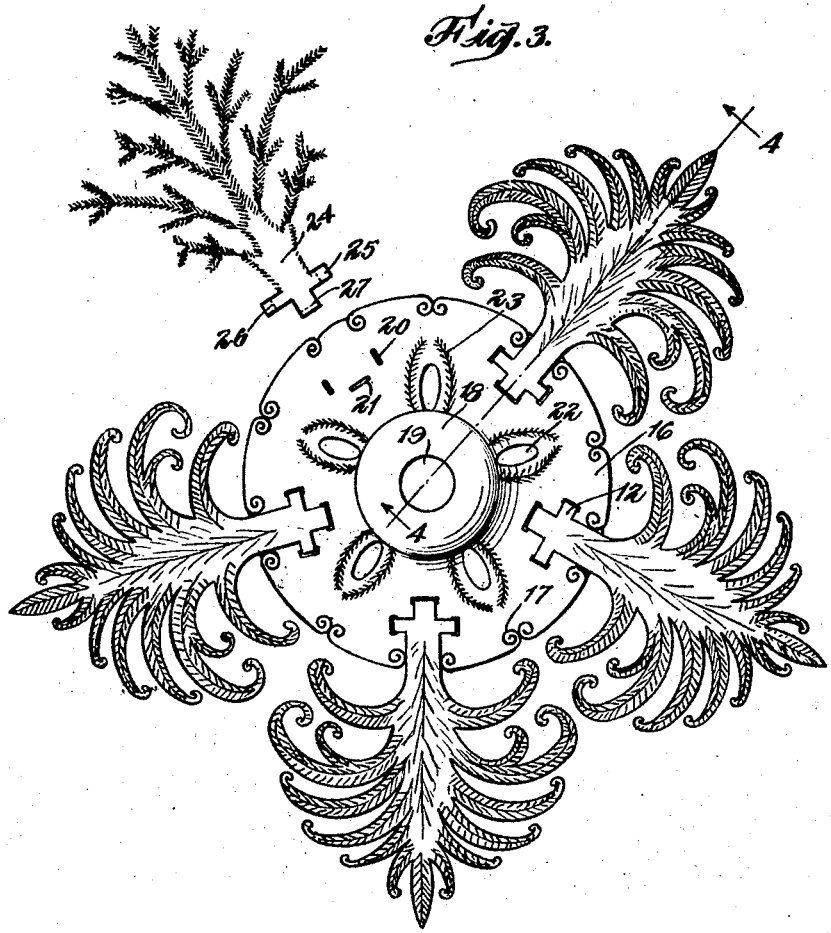
Fig. 3 is a view similar to Figure 2 on an enlarged scale illustrating the manner of attaching the single branches of a section to a holder for the same, modified in form.

The artificial Christmas tree constructed according to my invention as illustrated on the drawings consists of the stem or tree trunk 10 adapted to be set and supported at its lower end in any of the customary holders 11, and may be made of metal, wood or any other suitable material tapering from the foot to the upper end which may bear any suitable ornament as for instance a point 12. This point is hollow and adapted to receive the tip or upper end of the tree thus allowing the placing of branches thereon and afterward the placing of the point thereon. A plurality of branch sections artificially simulating the appearance of fir, spruce or other tree branches 13 is made integrally with a center piece 14 as illustrated in Figure 2, for instance, having a central opening 15 adapted to receive the tree-trunk and having varying diameters in order to adapt the same to the varying diameters of the tapering tree trunk allowing the holders to be firmly held according to the size of their openings between the foot and the upper end of the tree trunk.

Figure 4:
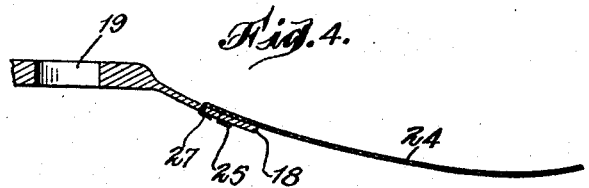
Fig. 4 is a section on line 4—4 of Figure 3.

A modified form of branch holder is illustrated in Figures 3 and 4, and according to this holder the body of the same constitutes a disk 16 with ornamental outer periphery 17, and a central collar 18 having a central opening 19, and a plurality of groups of openings 20 near its periphery. Each group of openings 20 comprises two parallel openings and one opening 21 arranged at right angles to the parallel openings 20. The collar 18 is surrounded on its outer periphery by a plurality of openings or elliptical slots 22 in turn surrounded by suitable ornaments 23 representing small branches.

The large tree-branches 24 of any desired contour simulating tree branches and artificially made of any suitable material as for instance lacquered tin, etc., have their inner ends formed with lateral branches or arms 25 and 26, the ends of which are adapted to be bent at right angles to the main body of the arms, and an extension arm 27 having an outer end also adapted to be bent rectangularly with respect to its body.

The ends of the arms 25 and 26 are placed through the parallel slots 20 and the end of arm 27 through the slot 21 and are then bent at the opposite side of the holder against the lower face of the same so that the branches are securely held in place on the holders. The central openings of the holders have varying diameters so as to allow a filing of the branch sections upon the tree trunk.

It will be clear that in this manner an artificial Christmas or other tree has been constructed of pleasing appearance simulating the heretofore used live trees resulting in great saving of forests etc. and allowing with small costs the use of Christmas trees of varying kinds, fir or spruce etc. trees according to wish and inclination.

It is to be understood that while I have shown and described some of the forms of my tree as an example, the construction of the tree may be varied in many ways within the scope of the appended claims without departure from the invention.

Having thus described my invention what I claim as new and desire to secure by Letters Patent is:

1. Artificial Christmas-tree comprising a tapering trunk adapted to be held with its lower enlarged foot within a holder, a point on its upper, thinner end, and a plurality of substantially flat perforated holding means for artificial branch sections simulating tree branches and having central openings of varying diameters allowing a filing of the branch holding means upon said tree trunk in superposition and spaced from each other, and means engaging the perforations in said holding means for securing artificial tree branches to the same, the whole simulating a tree.

2. Artificial Christmas-tree comprising a tapering trunk, a plurality of holders, each having a central perforated collar adapted to be filed upon said trunk in superposition and in spaced relation to each other, perforated disks on said holders, and a plurality of branch sections each having an extension arm in the direction of its longitudinal axis, and two branch arms transversely arranged thereto, said arms having their outer ends adapted to be bent at right angles to the arms allowing an introduction of the same through the perforations in said disk and bending of the ends against the underside of said disks for holding said branches exchangeably on said disks and tree.

3. Artificial Christmas-tree comprising a tapering tree trunk, collars of varying diameters in their central openings allowing a filing of said collars on said trunk in superposition thereon and spaced according to the taper in the trunk and width of the holes, a disk for each collar having groups of elongated perforations therein near its periphery, two of the perforations of each group being parallel to each other and the third rectangularly disposed to the other two, a plurality of branches simulating tree branches, each having a longitudinal extension arm and a pair of cross-wise arranged arms, the ends of all of the arms adapted to be rectangularly bent at their bodies and adapted to enter and pass through the perforations of said groups, allowing a bending of these ends against the lower faces of the disks for firmly holding and attaching the branches to said disks.

In testimony whereof I affix my signature.

JAKOB HOJNOWSKI.